(12) United States Patent
Beach

(10) Patent No.: US 6,497,305 B2
(45) Date of Patent: Dec. 24, 2002

(54) FOOD SERVICE CONVEYOR SYSTEM

(76) Inventor: Pearl Beach, 7925 E. 27$^{th}$ Ct., Tulsa, OK (US) 74129

( * ) Notice: Subject to any disclaimer, the term of this patent is extended or adjusted under 35 U.S.C. 154(b) by 168 days.

(21) Appl. No.: 09/742,805

(22) Filed: Dec. 20, 2000

(65) Prior Publication Data

US 2002/0007737 A1 Jan. 24, 2002

Related U.S. Application Data

(63) Continuation-in-part of application No. 09/426,147, filed on Oct. 22, 1999, now abandoned, which is a continuation-in-part of application No. 09/022,685, filed on Feb. 12, 1998, now abandoned.

(51) Int. Cl.$^7$ ............................. E04H 3/04; F25D 25/02
(52) U.S. Cl. ........................................... 186/49; 62/381
(58) Field of Search ........................... 186/31, 38, 49, 186/57, 69; 198/570, 803.16, 952; 99/483, 484; 62/246, 250, 251, 257, 381, 382, 458; 312/114, 116, 125, 236, 237

(56) References Cited

U.S. PATENT DOCUMENTS

| | | | | |
|---|---|---|---|---|
| 2,327,631 A | * | 8/1943 | Fibus | 211/74 |
| 2,644,567 A | | 7/1953 | Springer | |
| 2,677,940 A | * | 5/1954 | Raskin | 62/89.5 |
| 2,986,019 A | * | 5/1961 | Happer | 62/250 |
| 3,481,154 A | * | 12/1969 | Johnson | 62/439 |
| 3,874,479 A | | 4/1975 | Onori et al. | |
| 3,887,786 A | * | 6/1975 | Witt et al. | 211/163 |
| 4,007,810 A | | 2/1977 | Weddendorf | |
| 4,165,620 A | | 8/1979 | Gehauf nee Kiesel et al. | |
| 4,314,458 A | * | 2/1982 | Hade et al. | 62/256 |
| 4,765,440 A | | 8/1988 | Tashman | |
| 4,848,091 A | * | 7/1989 | Border | 62/258 |
| 5,377,492 A | | 1/1995 | Robertson et al. | |
| 5,419,099 A | | 5/1995 | Mueller et al. | |
| 5,477,778 A | | 12/1995 | Kuwahara | |

FOREIGN PATENT DOCUMENTS

| | | | | |
|---|---|---|---|---|
| JP | 4-60375 A | * | 2/1992 | F25D/25/02 |

* cited by examiner

Primary Examiner—Donald P. Walsh
Assistant Examiner—Mark J. Beauchaine

(57) ABSTRACT

A food service conveyor system for providing a space saving device for holding hot and cold food. The system includes a base for resting on a surface, and a plurality of rotatable levels mounted on the base. The plurality of rotatable levels comprises a first one of the rotatable levels being positioned adjacent to the base, a second one of the rotatable levels being mounted adjacent to and above the first rotatable level, and a third one of the rotatable levels being mounted adjacent to and above the second rotatable level. The first rotatable level has a first rotatable panel with an upper surface for supporting food containers and a first annular support located below the first rotatable panel. The first annular support includes cooling means for cooling the upper surface of the first rotatable panel. The second rotatable level has a second rotatable panel with an upper surface for supporting food containers and a second annular support located below the second rotatable panel. The second annular support includes a first heating means for heating the upper surface of the second rotatable panel. The third rotatable level comprises a third rotatable panel with an upper surface and a third circular support located below the third rotatable panel. The third circular support includes a second heating means for heating the upper surface of the third rotatable panel.

18 Claims, 5 Drawing Sheets

SIDE VIEW OF MOTOR, SHAFTS, PULLEYS & BELTS

FOOD SERVICE CONVEYOR SYSTEM

REFERENCE TO RELATED APPLICATIONS

This patent application is a continuation-in-part of my utility patent application Ser. No. 09/426,147, filed Oct. 22, 1999, which was a continuation-in-part of my utility patent application Ser. No. 09/022,685, filed Feb. 12, 1998 now abandoned.

BACKGROUND OF THE INVENTION

1. Field of the Invention

The present invention relates to food conveyors and more particularly pertains to a new food service conveyor system for providing a space saving device for holding hot and cold food.

2. Description of the Prior Art

The use of food conveyors is known in the prior art. More specifically, food conveyors heretofore devised and utilized are known to consist basically of familiar, expected and obvious structural configurations, notwithstanding the myriad of designs encompassed by the crowded prior art which have been developed for the fulfillment of countless objectives and requirements.

Known prior art food conveyors include U.S. Pat. No. 2,644,567, U.S. Pat. No. 4,765,440; U.S. Pat. No. 3,874,479; U.S. Pat. No. 4,007,810; U.S. Pat. No. 4,165,620; U.S. Pat. No. 5,377,492; and U.S. Pat. No. 5,419,099, and U.S. Pat. No. 5,477,778.

While these devices fulfill their respective, particular objectives and requirements, the aforementioned patents do not disclose a new food service conveyor system. The inventive device includes a base for resting on a surface, and a plurality of rotatable levels mounted on the base. The plurality of rotatable levels comprises a first one of the rotatable levels being positioned adjacent to the base, a second one of the rotatable levels being mounted adjacent to and above the first rotatable level, and a third one of the rotatable levels being mounted adjacent to and above the second rotatable level. The first rotatable level has a first rotatable panel with an upper surface for supporting food containers and a first annular support located below the first rotatable panel. The first annular support includes cooling means for cooling the upper surface of the first rotatable panel. The second rotatable level has a second rotatable panel with an upper surface for supporting food containers and a second annular support located below the second rotatable panel. The second annular support includes a first heating means for heating the upper surface of the second rotatable panel. The third rotatable level comprises a third rotatable panel with an upper surface and a third circular support located below the third rotatable panel. The third circular support includes a second heating means for heating the upper surface of the third rotatable panel.

In these respects, the food service conveyor system according to the present invention substantially departs from the conventional concepts and designs of the prior art, and in so doing provides an apparatus primarily developed for the purpose of providing a space saving device for holding hot and cold food.

SUMMARY OF THE INVENTION

In view of the foregoing disadvantages inherent in the known types of food conveyors now present in the prior art, the present invention provides a new food service conveyor system wherein the same can be utilized for providing a space saving device for holding hot and cold food.

The general purpose of the present invention, which will be described subsequently in greater detail, is to provide a new food service conveyor system which has many of the advantages of the food conveyors mentioned heretofore and many novel features that result in a new food service conveyor system which is not anticipated, rendered obvious, suggested, or even implied by any of the prior art food conveyors, either alone or in any combination thereof.

To attain this, the present invention generally comprises a base for resting on a surface, and a plurality of rotatable levels mounted on the base. The plurality of rotatable levels comprises a first one of the rotatable levels being positioned adjacent to the base, a second one of the rotatable levels being mounted adjacent to and above the first rotatable level, and a third one of the rotatable levels being mounted adjacent to and above the second rotatable level. The first rotatable level has a first rotatable panel with an upper surface for supporting food containers and a first annular support located below the first rotatable panel. The first annular support includes cooling means for cooling the upper surface of the first rotatable panel. The second rotatable level has a second rotatable panel with an upper surface for supporting food containers and a second annular support located below the second rotatable panel. The second annular support includes a first heating means for heating the upper surface of the second rotatable panel. The third rotatable level comprises a third rotatable panel with an upper surface and a third circular support located below the third rotatable panel. The third circular support includes a second heating means for heating the upper surface of the third rotatable panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide ,a new food service conveyor system which has many of the advantages of the food conveyors mentioned heretofore and many novel features that result in a new food service conveyor system which is not anticipated, rendered obvious, suggested, or even implied by any of the prior art food conveyors, either alone or in any combination thereof.

It is another object of the present invention to provide a new food service conveyor system that may be easily and efficiently manufactured and marketed.

It is a further object of the present invention to provide a new food service conveyor system that is of a durable and reliable construction.

An even further object of the present invention is to provide a new food service conveyor system which is susceptible of a low cost of manufacture with regard to both materials and labor, and which accordingly is then susceptible of low prices of sale to the consuming public, thereby making such food service conveyor system economically available to the buying public.

Still yet another object of the present invention is to provide a new food service conveyor system which provides in the apparatuses and methods of the prior art some of the advantages thereof, while simultaneously overcoming some of the disadvantages normally associated therewith.

Still another object of the present invention is to provide a new food service conveyor system for providing a space saving device for holding hot and cold food.

Yet another object of the present invention is to provide a new food service conveyor system that includes a base for resting on a surface, and a plurality of rotatable levels mounted on the base. The plurality of rotatable levels comprises a first one of the rotatable levels being positioned adjacent to the base, a second one of the rotatable levels being mounted adjacent to and above the first rotatable level, and a third one of the rotatable levels being mounted adjacent to and above the second rotatable level. The first rotatable level has a first rotatable panel with an upper surface for supporting food containers and a first annular support located below the first rotatable panel. The first annular support includes cooling means for cooling the upper surface of the first rotatable panel. The second rotatable level has a second rotatable panel with an upper surface for supporting food containers and a second annular support located below the second rotatable panel. The second annular support includes a first heating means for heating the upper surface of the second rotatable panel. The third rotatable level comprises a third rotatable panel with an upper surface and a third circular support located below the third rotatable panel. The third circular support includes a second heating means for heating the upper surface of the third rotatable panel.

Still yet another object of the present invention is to provide a new food service conveyor system that may be placed on a table to hold dishes and food containers and keep the food and beverages with the containers hot or cold.

Even still another object of the present invention is to provide a new food service conveyor system that is of a convenient size to place on a table and hold commonly sized dishes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
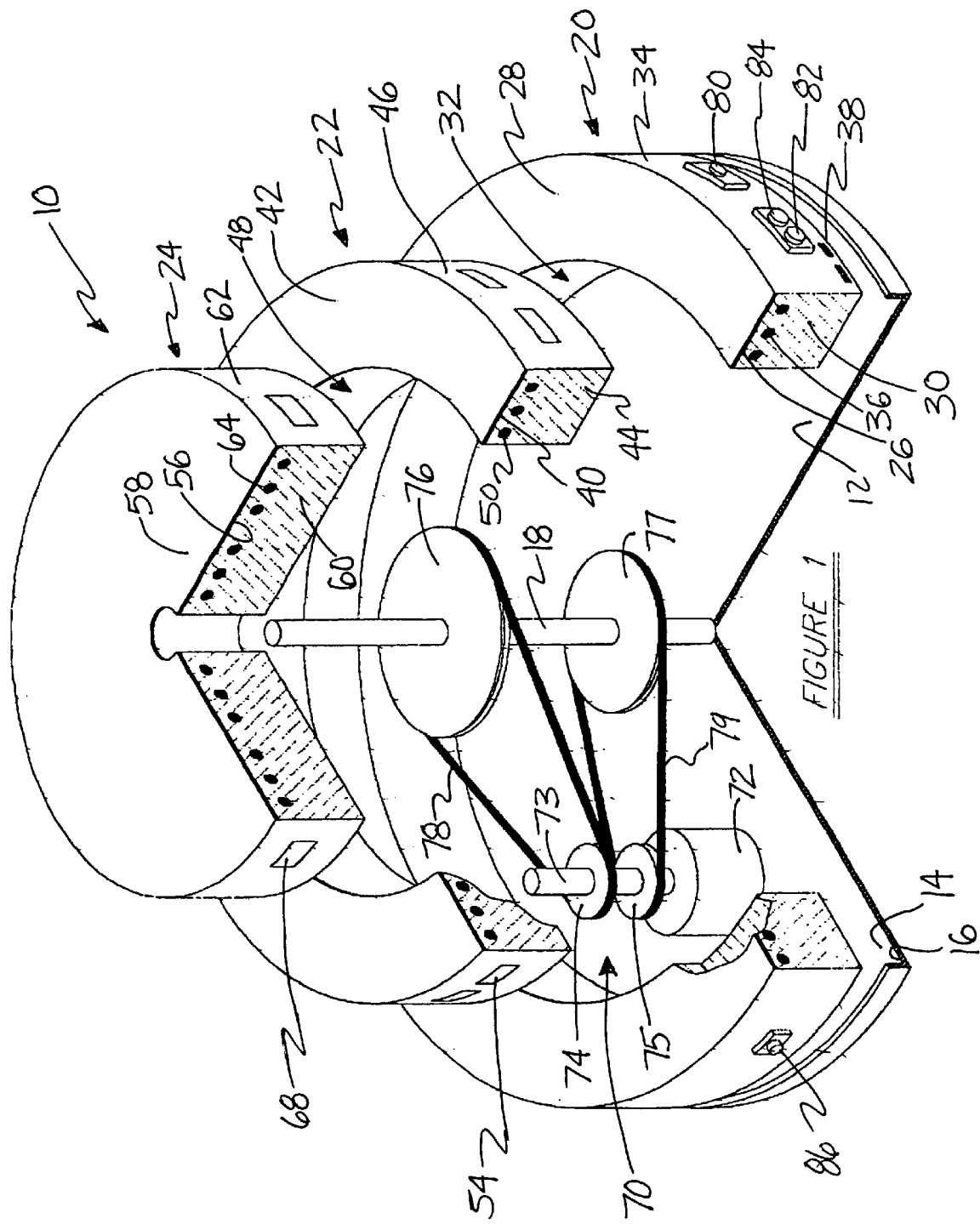
FIG. 1 is a schematic exploded perspective view of the food service conveyor system with optional electrical resistance conduction heating elements.
Figure 2:
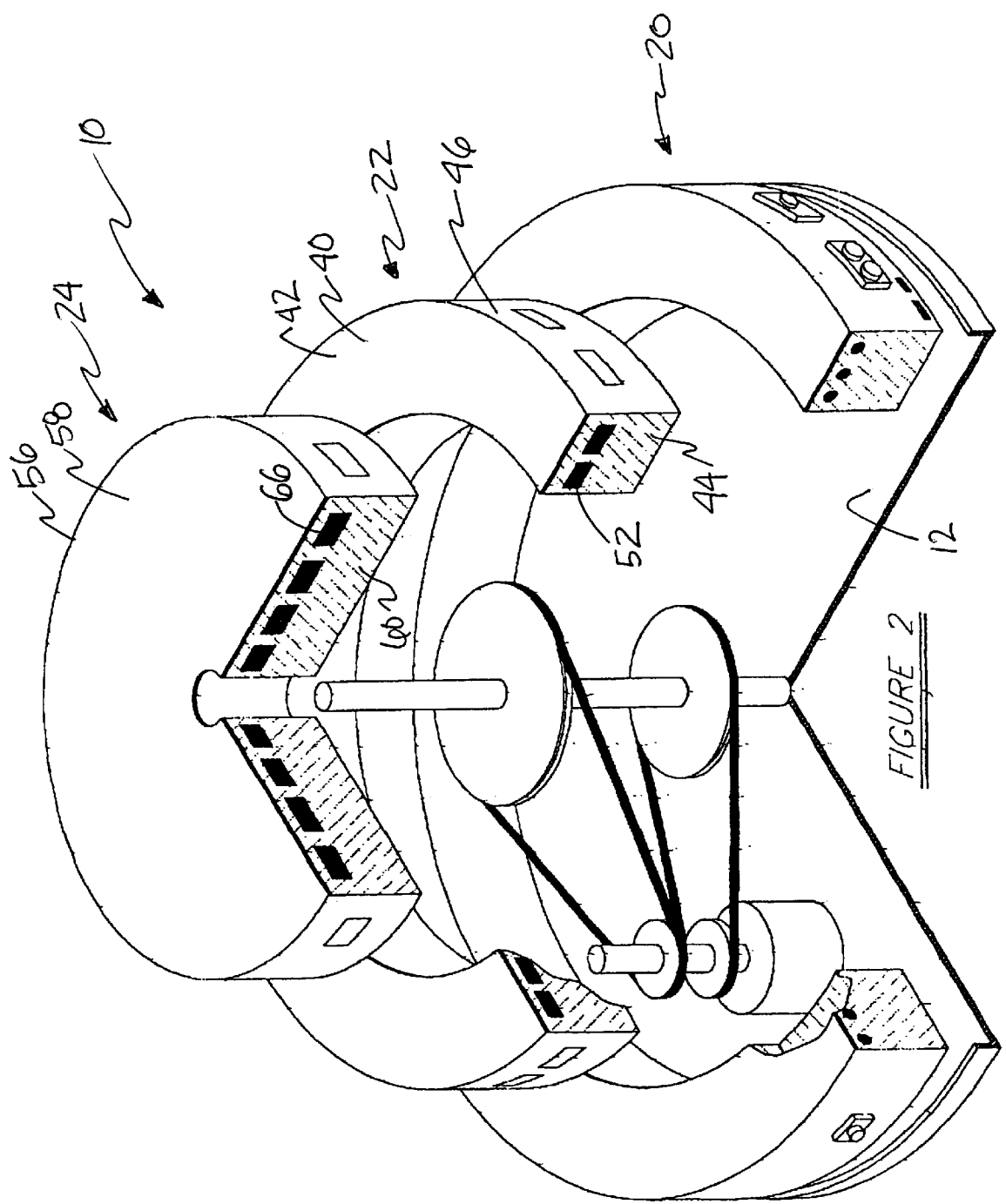
FIG. 2 is a schematic exploded perspective view of an embodiment of the food service conveyor system of the invention with optional magnetic induction heating elements.
Figure 3:
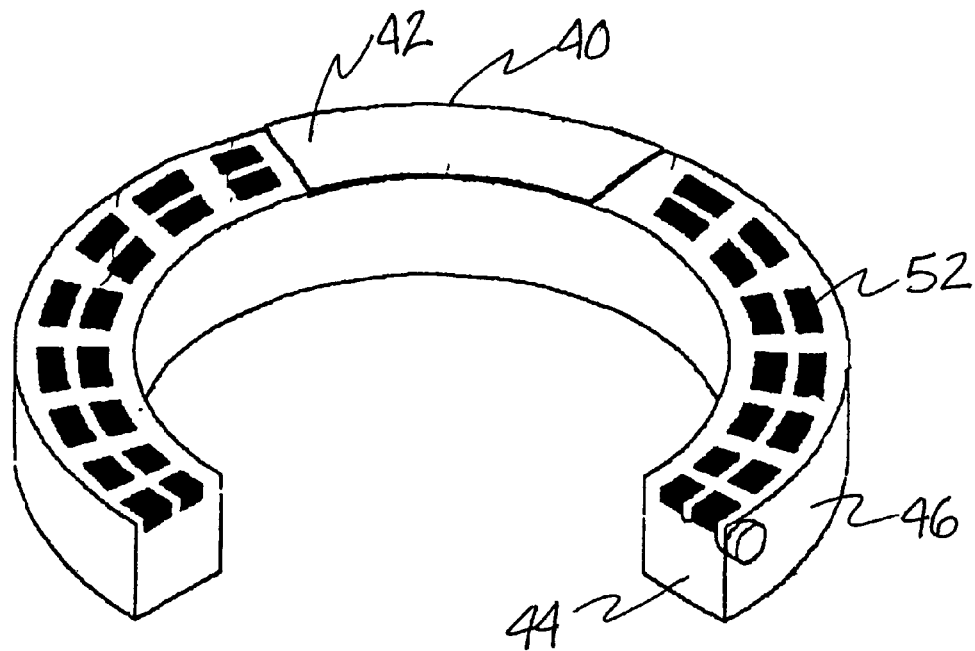
FIG. 3 is a schematic perspective view of a portion of the second annular support of the food service conveyor system.
Figure 4:
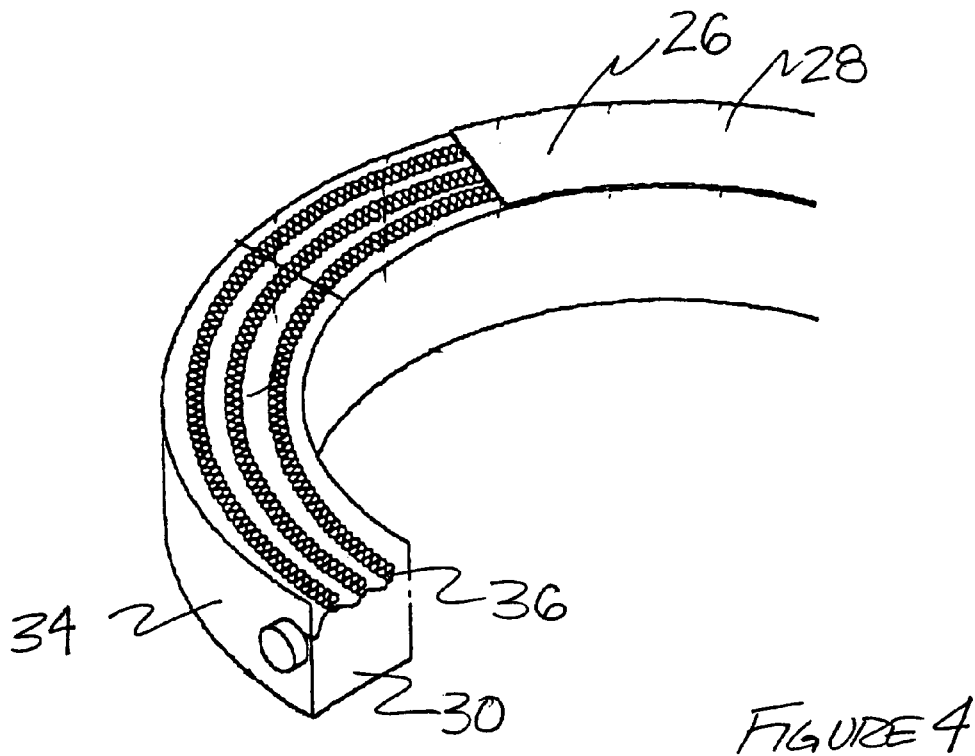
FIG. 4 is a schematic perspective view of a portion of the first annular support of the food service conveyor system.
Figure 5:
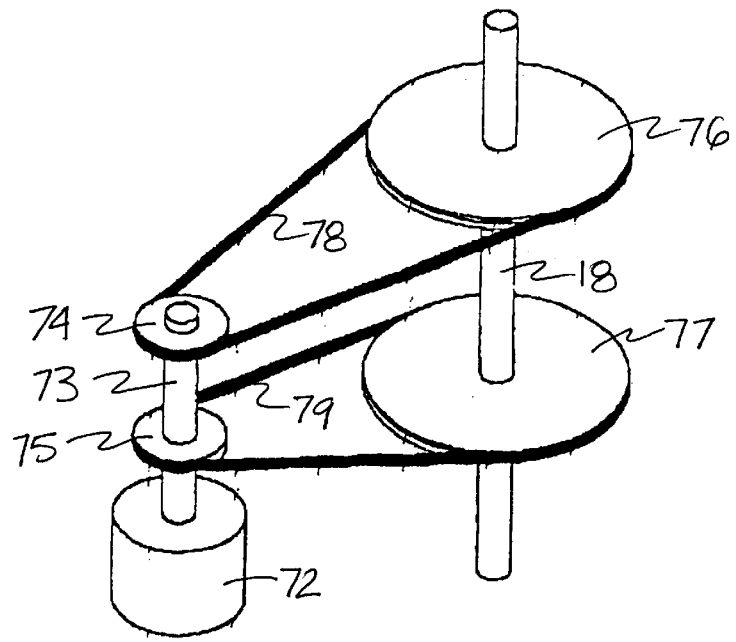
FIG. 5 is a schematic perspective view of a portion of the drive system of the food service conveyor system.
Figure 6:
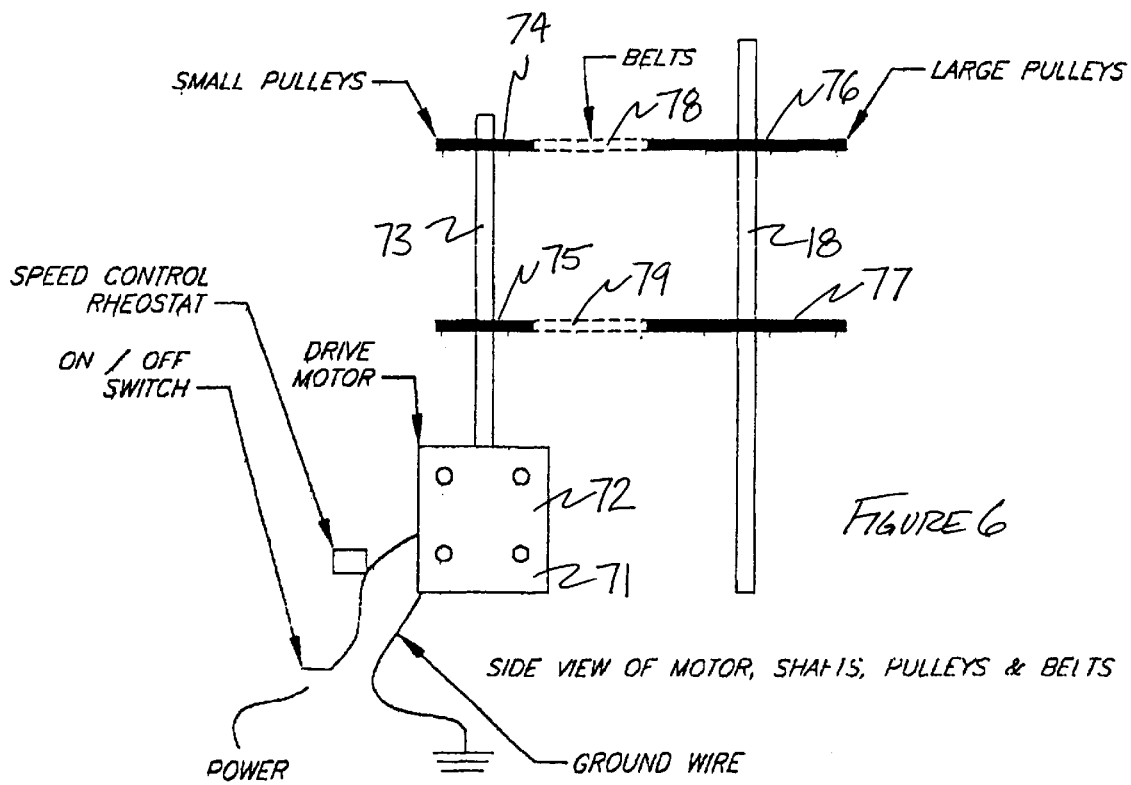
FIG. 6 is a schematic side view of a portion of the drive system of the food service conveyor system.
Figure 7:
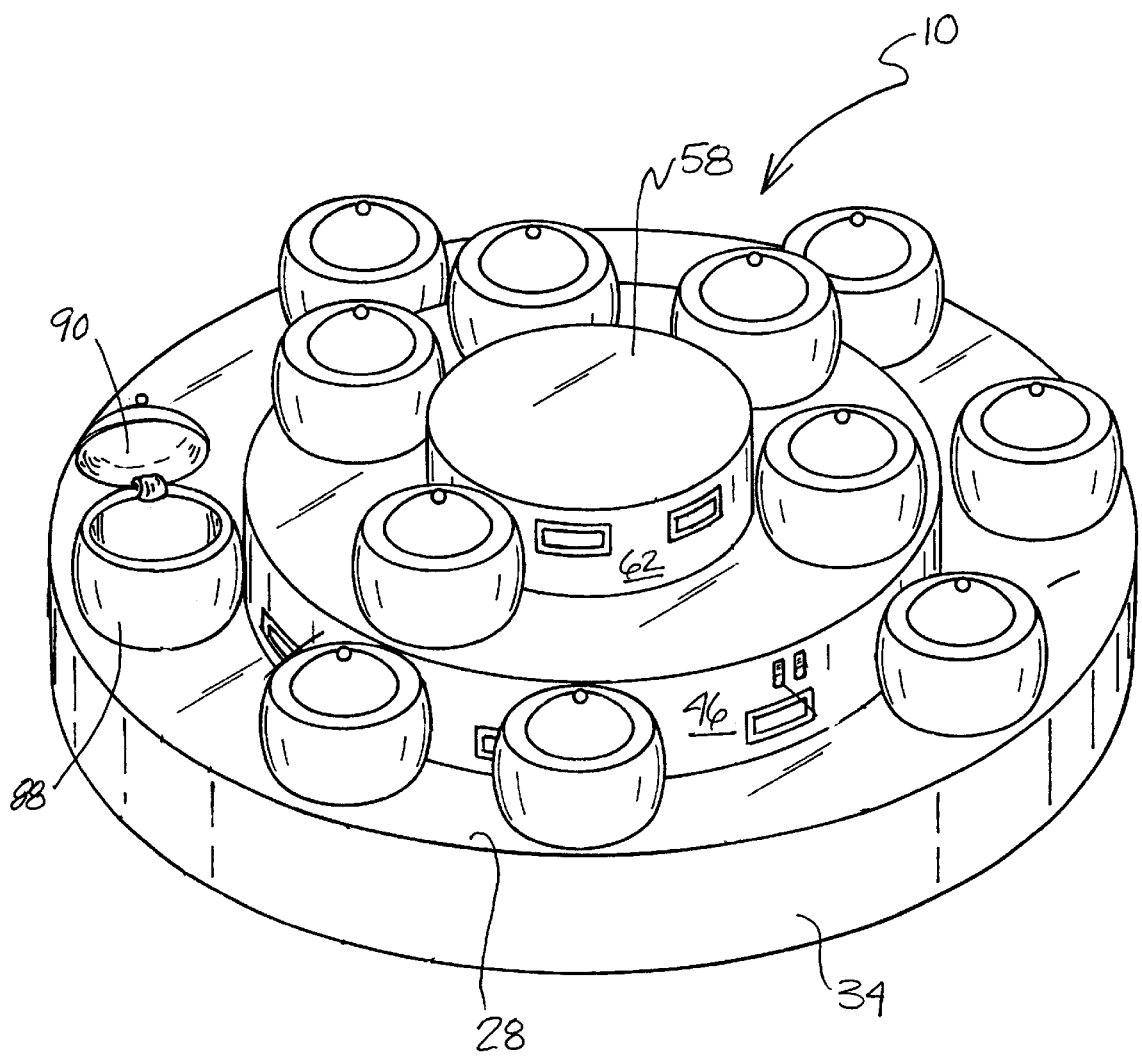
FIG. 7 is a schematic perspective view of the food service conveyor system of the invention.

With reference now to the drawings, and in particular to FIGS. 1 through 7 thereof, a new food service conveyor system embodying the principles and concepts of the present invention and generally designated by the reference numeral 10 will be described.

As best illustrated in FIGS. 1 through 7, the food service conveyor system of the invention is highly suitable for transporting a plurality of food serving containers.

The system includes a base 12 for resting on a surface. The base may comprise a bottom wall 14 having a perimeter 15, and a perimeter wall 16 mounted on the perimeter of the bottom wall. Preferably, the perimeter wall is oriented substantially perpendicular to an upper surface of the bottom wall. The base may also include a central shaft 18 rotationally mounted on the bottom wall, with the central shaft preferably being oriented substantially perpendicular to the bottom wall.

The system of the invention also includes a plurality of rotatable levels. Each of the rotatable levels may be mounted to a portion of the central shaft. The plurality of rotatable levels comprises a first one 20 of the rotatable levels being positioned adjacent to the base, a second one 92 of the rotatable levels beings mounted adjacent to and above the first rotatable level, and a third one 24 of the rotatable levels being mounted adjacent to and above the second rotatable level.

The first rotatable level 20 has a first rotatable panel 26 with an upper surface 28 for supporting food containers, and a first annular support 30 located below the first rotatable panel. Preferably, the first rotatable panel rotates while the first annular support is stationary. The first rotatable level has a central hole 32 with an inner diameter. The first annular support may have an outer surface 34. The first annular support includes cooling means for cooling the upper surface of the first rotatable panel. The cooling means may comprise a plurality of micro-refrigeration coils 36 embedded in the first annular support below the upper surface of the first rotatable panel, and the coils may extend along the upper surface of the first annular support. Optionally, a plurality of vents 38 may be mounted in the outer surface of the first rotatable level.

The second rotatable level 22 has a second rotatable panel 40 with an upper surface 42 for supporting food containers and a second annular support 44 located below the second rotatable panel. Preferably, the second rotatable panel rotates while the second annular support is stationary. The second annular support may have an outer surface 46. The second rotatable level may have an outer diameter that is relatively smaller than the inner diameter of the first rotatable level such that the upper surface of the first rotatable level is located radially outward from the outer surface of the second rotatable level. The second rotatable level may also have a hole 48 with an inner diameter. Optionally, a vent (not shown) may be mounted in the second annular support to permit air to pass through the second annular support.

The second annular support includes a first heating means for heating the upper surface of the second rotatable level. The first heating means may comprise a plurality of electrical resistance conduction heating elements 50 embedded in the second rotatable level below the upper surface of the second rotatable level. Optionally, the first heating means may comprise a plurality of magnetic induction heating elements 52 embedded in the second annular support below the upper surface of the second rotatable panel. The second rotatable panel may comprise a ceramic material, such as, for example, a tempered glass, and may have a thickness of approximately three-sixteenths to one-quarter inch thick. Optionally, the upper surface of the second rotatable level may comprise a metallic material such as stainless steel.

A plurality of lights 54 may be mounted on the outer surface of the second annular support for shining light over the upper surface of the first rotatable level. Illustratively, the plurality of lights may each comprise a fluorescent light.

The third rotatable level 24 comprises a third rotatable panel 56 with an upper surface 58 and a third circular support 60 located below the third rotatable panel. Preferably, the third rotatable panel rotates while the third circular support is stationary. The third rotatable level may have an outer diameter that is relatively smaller than an inner diameter of the second level such that the upper surface of the second rotatable level is located radially outward from the outer surface of the third rotatable level. The third circular support 60 may have an outer surface 62. The third circular support includes a second heating means for heating the upper surface of the third rotatable panel. The second heating means may comprise a plurality of electrical resistance conduction heating elements 64 embedded in the third circular support.

Optionally, the second heating means may comprise a plurality of magnetic induction heating elements 66 embedded in the third circular support. The upper surface of the third rotatable panel may comprise a ceramic material, such as, for example, a tempered glass.

A plurality of lights 68 may be mounted on the outer surface of the third rotatable level for shining light over the upper surface of the second rotatable level.

A drive system 70 may be provided for rotating the plurality of rotatable levels of the invention. The drive system may include a motor 72 having a rotating drive shaft 73, a plurality of drive pulleys 74, 75 mounted on the rotating drive shaft, a plurality of driven pulleys 76, 77 mounted on the central shaft, and a plurality of belts 78, 79. Each of the belts connects one of the drive pulleys to one of the driven pulleys. Each of the driven pulleys may have a unique diameter such that the driven pulleys are rotated at different rotational speeds. The motor may be mounted on the base 12, and the motor may be selectively slidably movable with respect to the central shaft for adjusting the tension of the belts. A mounting plate 71 may be mounted on the motor for adjustably mounting the motor onto the base.

A plurality of controls may be mounted on the first rotatable level. The plurality of controls may include a power switch 80 for selectively supplying power to the motor, the cooling means and the first and second heating means. The power switch 80 may also selectively provide power to the lights 54, 68 mounted on the supports. The controls may also include thermostats 82, 84 that control the supply of power to the heat and cooling means of the various levels. Controls 86 may also be included that control the speed of rotation of the various levels. Optionally, a timing mechanism may be included that provides power to the motor intermittently, so that the levels rotate only during intermittent time periods, with a pause in the rotation between the periods of rotation.

In one embodiment of the invention, the third rotatable panel rotates at a relatively slow speed so that food in the food containers retains relatively the greatest amount of heat, which is highly preferable for main course foods.

The base may comprise a tray adapted for collecting and holding any condensation falling from the rotatable levels. Each of the supports may comprise a polycarbonate material.

Optionally, the food holding containers 88 may have lids 90 that pop or spring up without having to lift the lid, and may be activated by simply pushing downwardly on the lid for a short distance to activate a lid lifting mechanism (not shown) which moves the lid into a raised, tilted position. The lid may be closed by pushing the lid downwardly toward the closed position so that the lifting mechanism is retracted.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food service conveyor system for transporting a plurality of food serving containers, the system comprising:
    a base for resting on a surface,
    a plurality of rotatable levels mounted on the base, the plurality of rotatable levels comprising:
        a first one of the rotatable levels being positioned adjacent to the base, the first rotatable level having a first rotatable panel with an upper surface for supporting food containers, the first rotatable level having a first annular support located below the first rotatable panel, the first annular support including cooling means for cooling the upper surface of the first rotatable panel of the first rotatable level;
a second one of the rotatable levels being mounted adjacent to and above the first rotatable level, the second rotatable level having a second rotatable panel with an upper surface for supporting food containers, the second rotatable level having a second annular support located below the second rotatable panel, the second annular support including a first heating means for heating the upper surface of the second rotatable panel of the second rotatable level; and
a third one of the rotatable levels being mounted adjacent to and above the second rotatable level, the third rotatable level comprising a third rotatable panel with an upper surface for supporting food containers, the third rotatable level comprising a third circular support located below the third rotatable panel, the third circular support having an outer surface, the third circular support including a second heating means for heating the upper surface of the third rotatable panel of the third rotatable level.

2. The system of claim 1 wherein the base comprises a bottom wall having a perimeter, a perimeter wall mounted on the perimeter of the bottom wall, and a central shaft rotationally mounted on the bottom wall, the central shaft being oriented substantially perpendicular to the bottom wall.

3. The system of claim 2 additionally comprising a drive system for rotating the plurality of rotatable levels.

4. The system of claim 3 wherein the drive system comprises a motor, the motor having a rotating drive shaft, a plurality of drive pulleys being mounted on the rotating drive shaft, a plurality of driven pulleys mounted on the central shaft, a plurality of belts, each of the belts connecting one of the drive pulleys to one of the driven pulleys, wherein each of the driven pulleys has a unique diameter such that the driven pulleys are rotated at different rotational speeds, wherein the motor is mounted on the base, the motor being selectively slidably movable with respect to the central shaft for adjusting the tension of the belts.

5. The system of claim 1 wherein the first rotatable level has a central hole with an inner diameter, the first annular support having an outer surface, the second rotatable level having an outer diameter relatively smaller than the inner diameter of the first rotatable level such that the upper surface of the first rotatable level is located radially outward from the outer surface of the second rotatable level, the second rotatable level having a hole with an inner diameter, the second annular support having an outer surface, the third annular support having an outer surface, and the third level having an outer diameter relatively smaller than an inner diameter of the second level such that the upper surface of the second rotatable level is located radially outward from the outer surface of the third annular support.

6. The system of claim 1 wherein the cooling means comprises a plurality of micro-refrigeration coils mounted in the first annular support below the first rotatable panel, the micro-refrigeration coils extending adjacent to an upper surface of the first annular support.

7. The system of claim 1 wherein a plurality of vents are mounted in the outer surface of the first annular support for permitting air movement through the first annular support.

8. The system of claim 1 wherein the first heating means comprises a plurality of electrical resistance conduction heating elements embedded in the second annular support below an upper surface of the second annular support.

9. The system of claim 1 wherein the first heating means comprises a plurality of magnetic induction heating elements embedded in the second annular support below an upper surface of the second annular support.

10. The system of claim 1 wherein a plurality of lights are mounted on the outer surface of the second annular support for shining light over the upper surface of the first rotatable panel.

11. The system of claim 1 wherein the second heating means comprises a plurality of electrical resistance conduction heating elements embedded in the third annular support below an upper surface of the third annular support.

12. The system of claim 1 wherein the second heating means comprises a plurality of magnetic induction heating elements embedded in the third annular support below an upper surface of the third annular support.

13. The system of claim 1 wherein a plurality of lights are mounted on the outer surface of the third annular support for shining light over the upper surface of the second rotatable panel.

14. The system of claim 1 wherein a plurality of controls are mounted on the first rotatable level, the plurality of controls including a power switch for selectively supplying power to a motor, the cooling means and the first and second heating means.

15. The system of claim 1 wherein the base comprises a tray adapted for collecting and holding any condensation falling from the rotatable levels.

16. The system of claim 1 wherein each of the supports comprises a polycarbonate material.

17. The system of claim 1 wherein the first annular support, the second annular support, and the third circular support are stationary and the first rotatable panel, the second rotatable panel, and the third rotatable panels rotate with respect to the supports.

18. A food service conveyor system for transporting a plurality of food serving containers, the system comprising:
a base for resting on a surface, the base comprising:
a bottom wall having a perimeter;
a perimeter wall mounted on the perimeter of the bottom wall, the perimeter wall being oriented substantially perpendicular to an upper surface of the bottom wall; and
a central shaft rotationally mounted on the bottom wall, the central shaft being oriented substantially perpendicular to the bottom wall;
a plurality of rotatable levels, each of the rotatable levels being mounted to a portion of the central shaft, the plurality of rotatable levels comprising:
a first one of the rotatable levels being positioned adjacent to the base, the first rotatable level having a first rotatable panel with an upper surface for supporting food containers, the first rotatable level having a central hole with an inner diameter, the first rotatable level having a stationary first annular support located below the first rotatable panel, the first annular support having an outer surface, the first annular support comprising:
cooling means for cooling the upper surface of the first rotatable level, the cooling means comprising a plurality of micro-refrigeration coils mounted in the first rotatable level below the upper surface of the first rotatable level, the micro-refrigeration coils extending along the upper surface of the first rotatable level;

a plurality of vents being mounted in the outer surface of the first rotatable level;

a second one of the rotatable levels being mounted adjacent to and above the first rotatable level, the second rotatable level having a second rotatable panel with an upper surface for supporting food containers, the second rotatable level having an outer diameter relatively smaller than the inner diameter of the first rotatable level such that the upper surface of the first rotatable level is located radially outward from the outer surface of the second rotatable level, the second rotatable level having a hole with an inner diameter, the second rotatable level having a stationary second annular support located below the second rotatable panel, the second annular support having an outer surface, the second annular support comprising:

- a first heating means for heating the upper surface of the second rotatable level, wherein the first heating means comprising a plurality of electrical resistance conduction heating elements embedded in the second rotatable level below the upper surface of the second rotatable level; and
- a plurality of lights mounted on the outer surface of the second rotatable level for shining light over the upper surface of the first rotatable level;

a third one of the rotatable levels being mounted adjacent to and above the second rotatable level, the third rotatable level comprising a third rotatable panel with an upper surface, the third level having an outer diameter relatively smaller than an inner diameter of the second level such that the upper surface of the second rotatable level is located radially outward from the outer surface of the third rotatable level, the third rotatable level comprising a stationary third circular support located below the third rotatable panel, the third circular support having an outer surface, the third circular support comprising a second heating means for heating: the upper surface of the third rotatable level, wherein the second heating means comprises a plurality of electrical resistance conduction heating elements embedded in the third rotatable level below the upper surface of the third rotatable level; and a drive system for rotating the plurality of rotatable levels, the drive system comprising:
- a motor, the motor having a rotating drive shaft;
- a plurality of drive pulleys being mounted on the rotating drive shaft;
- a plurality of driven pulleys mounted on the central shaft;
- a plurality of belts, each of the belts connecting one of the drive pulleys to one of the driven pulleys;
- wherein each of the driven pulleys has a unique diameter such that the driven pulleys are rotated at different rotational speeds;
- wherein the motor is mounted on the base, the motor being selectively slidably movable with respect to the central shaft for adjusting the tension of the belts;

a plurality of controls being mounted on the first rotatable level, the plurality of controls including a power switch for selectively supplying power to the motor, the cooling means and the first and second heating means;

wherein the base comprises a tray adapted for collecting and holding any condensation falling from the rotatable levels.

* * * * *